US006861765B2

(12) United States Patent

Taniguchi

(10) Patent No.: US 6,861,765 B2

(45) Date of Patent: Mar. 1, 2005

(54) GENERATOR SYSTEM FOR USE IN AUTOMOTIVE VEHICLE

(75) Inventor: Makoto Taniguchi, Kariya (JP)

(73) Assignee: Denso Corporation, Kariya (JP)

(*) Notice: Subject to any disclaimer, the term of this patent is extended or adjusted under 35 U.S.C. 154(b) by 138 days.

(21) Appl. No.: 10/351,538

(22) Filed: Jan. 27, 2003

(65) Prior Publication Data

US 2003/0155202 A1 Aug. 21, 2003

(30) Foreign Application Priority Data

Feb. 15, 2002 (JP) ....................................... 2002-037990

(51) Int. Cl.[7] .......................... F02N 11/06; F16D 43/00; F16H 59/00; F16H 61/00; F16H 63/00

(52) U.S. Cl. .......................... 290/40 R; 192/45; 474/70

(58) Field of Search ................................ 192/45, 41 R; 477/62; 290/40 R, 40 C

(56) References Cited

U.S. PATENT DOCUMENTS 4,473,753 A * 9/1984 Izumi et al. .................. 290/45
4,725,259 A 2/1988 Miyata ........................ 474/70
4,757,888 A * 7/1988 Nakajima .............. 192/84.961
5,074,392 A * 12/1991 Hasegawa et al. .......... 477/175
5,429,082 A * 7/1995 Wichelhaus ............. 123/198 R
5,527,233 A * 6/1996 Tabata et al. ................. 477/62
5,665,018 A * 9/1997 Miyata ........................ 474/74
5,689,174 A * 11/1997 Pacheco, Sr. ................ 322/16
5,733,214 A * 3/1998 Shiki et al. .................... 474/69
6,135,255 A * 10/2000 Myers ......................... 192/45
6,201,310 B1 * 3/2001 Adachi et al. .............. 290/4 C
6,455,946 B2 * 9/2002 Taniguchi .................... 290/32
6,661,109 B2 * 12/2003 Fukasaku et al. ......... 290/40 C
6,744,146 B2 * 6/2004 Fulton et al. ............. 290/37 A

FOREIGN PATENT DOCUMENTS

JP 358061338 A * 4/1983

* cited by examiner

*Primary Examiner*—Darren Schuberg
*Assistant Examiner*—Julio C. Gonzalez
(74) *Attorney, Agent, or Firm*—Oliff & Berridge, PLC

(57) ABSTRACT

A generator system includes an alternator driven by an engine through a driving belt and an electronic control unit for controlling operation of the engine. The alternator and the engine is coupled by a driving belt through a one-way clutch that transmits the engine torque to the alternator and intercepts torque transmission from the alternator to the engine. A malfunction in the one-way clutch is detected, under a condition where the engine speed is decreasing, by comparing a rotational speed of its inner ring connected to the alternator with a rotational speed of its outer ring coupled to the engine through the driving belt. The malfunctioning one-way clutch is either replaced or repaired, to thereby avoid damages of the driving belt caused by the clutch malfunction.

12 Claims, 5 Drawing Sheets

GENERATOR SYSTEM FOR USE IN AUTOMOTIVE VEHICLE

CROSS-REFERENCE TO RELATED APPLICATION

This application is based upon and claims benefit of priority of Japanese Patent Application No. 2002-37990 filed on Feb. 15, 2002, the content of which is incorporated herein by reference.

BACKGROUND OF THE INVENTION

1. Field of the Invention

The present invention relates to a generator system for use in an automotive vehicle, and more particularly to a system for detecting malfunction in a clutch, through which a rotational torque of an engine is transmitted to an alternator.

2. Description of Related Art

Recently, an alternator having a higher capacity is used in an automotive generator system because a larger electric power is required to operate various kinds of electric or electronic devices mounted on an automotive vehicle. Accordingly, an inertial moment of a rotor used in the alternator becomes large. On the other hand, an idling speed of the engine is set to a lower level to reduce unnecessary fuel consumption.

For various reasons including those mentioned above, a rotational speed of the alternator rotor in a recent generator system tends to vary in response to engine strokes. That is, a tension of a driving belt that transmits a rotational torque of the engine to the alternator rotor varies in response to the engine strokes. This causes a problem that a life of the driving belt is shortened, especially in a generator system for a diesel engine.

To cope with this problem, JP-A-61-228153 proposes to use a one-way clutch in an alternator pulley that is coupled to a crankshaft pulley of an engine through a driving belt. If the alternator is directly coupled to the crankshaft pulley through the driving belt without using the one-way clutch, the engine torque is transmitted to the alternator when the engine speed is increasing while the inertial torque of the alternator is transmitted to the engine when the engine speed is decreasing. Therefore, a driving tension is imposed alternately on one side and the other side of the driving belt according to changes in the engine speed. If the alternator is coupled to the engine through the one-way clutch, the engine torque is transmitted to the alternator while the inertial torque of the alternator is not transmitted to the engine. Therefore, the belt tension variations are suppressed by using the one-way clutch.

The one-way clutch is composed of an inner ring connected to the rotor of the alternator, an outer ring coupled to the crankshaft pulley through the driving belt, and sprags or rollers interposed between the inner and outer rings. A high mechanical stress is imposed on the one-way clutch because the one-way clutch is frequently switched between its ON and OFF states. Further, it is used under severe environmental conditions, e.g., at a temperature changing in a wide range and under high vibrations of the engine or the vehicle. The one-way clutch has to be designed to endure the high mechanical stress and the severe environmental conditions. It is difficult to make the one-way clutch compact in size while assuring its high reliability. It is also possible to use another type of clutch composed of a torsion spring and clutch shoes. In this type of clutch, however, shoe powders generated by abrasion may cause malfunction of the clutch.

It has become clear that most of malfunctions of the one-way clutch are caused by locking between the outer ring and the inner ring. When such locking occurs in the one-way clutch, the alternator and the engine are directly coupled as if no one-way clutch were used. The tension of the driving belt is frequently and repeatedly changed as described above. As a result, the life of the driving belt is shortened.

SUMMARY OF THE INVENTION

The present invention has been made in view of the above-mentioned problem, and an object of the present invention is to provide an improved generator system, in which malfunction of the one-way clutch is detected without fail.

The generator system includes an alternator driven by an engine and an electronic control unit (ECU) for controlling operation of the engine. Alternating current generated by the alternator is rectified into direct current and then supplied to an on-board battery. A one-way clutch is connected to a rotor of the alternator. The one-way clutch includes an inner ring connected to the rotor, an outer ring coupled to the engine through a driving belt, and rollers interposed between the inner ring and the outer ring. The one-way clutch transmits a rotational torque of the engine to the rotor while intercepting torque transmission from the rotor to the engine.

When the one-way clutch is normally operating, a rotational speed of the inner ring (an inner ring speed Ni) increases according to increase of a rotational speed of the outer ring (an outer ring speed Nc). The outer ring speed Nc is equal to a speed obtained by multiplying a rotational speed of the engine Ne by a pulley diameter ratio m ($Nc=m \cdot Ne$). In other words, the rotor is driven by the engine when the engine speed Ne is increasing. On the other hand, when the engine speed Ne is decreasing, i.e., the outer ring speed Nc is decreasing, the inner ring speed Ni temporarily becomes higher than the outer ring speed Nc due to an inertial torque of the rotor. However, the rotational torque of the rotor is not transmitted to the engine because the one-way clutch intercepts the torque transmission.

On the other hand, when the one-way clutch is malfunctioning, i.e., when the one-way clutch is in a locked state, the inner ring speed Ni becomes substantially equal to the outer ring speed Nc even if the engine speed Ne is decreasing. The inertial torque of the rotor is transmitted to the engine through the driving belt. Therefore, a tension of the driving belt periodically changes according to changes in the engine speed Ne, and therefore an operating life of the driving belt is shortened.

Since, when the engine speed Ne is decreasing, the inner ring speed Ni becomes substantially equal to the outer ring speed Nc if the one-way clutch is in the locked state, the locked state is detected by comparing Ni with Nc. When the malfunction due to the locking is detected, the malfunction is informed to a driver by means of a warning lamp or the like. The driver can either replace or repair the defective one-way clutch, thereby preventing the driving belt from being damaged due to the malfunction of the one-way clutch.

The detection of the clutch malfunction is prohibited when an operating rate of the alternator is higher than a predetermined rate, i.e., when the alternator is outputting a high power, because, under this condition, the inner ring speed Ni becomes equal to the outer ring speed Nc even if the one-way clutch is not in the locked state. Preferably, it is determined that the one-way clutch is malfunctioning only when the locked state is detected in excess of a certain number of times during a predetermined period in order to avoid misjudgment due to noises or other factors involved in the detecting process.

The function of detecting the malfunction in the one-way clutch may be included in the ECU. Alternatively, it may be included in a voltage regulator mounted on the alternator. The locked state in the one-way clutch may be detected by comparing an alternator speed (or rotor speed) Na divided by the pulley diameter ratio m with the engine speed Ne, instead of comparing the inner ring speed Ni with the outer ring speed Nc. The alternator speed Na may be detected based on a frequency of the alternator output.

According to the present invention, the malfunction in the one-way clutch is surely detected and informed to the driver who either replaces or repairs the defective one-way clutch. Thus, any damage of the driving belt caused by the clutch malfunction can he avoided.

Other objects and features of the present invention will become more readily apparent from a better understanding of the preferred embodiments described below with reference to the following drawings.

DETAILED DESCRIPTION OF THE PREFERRED EMBODIMENTS

Figure 1:
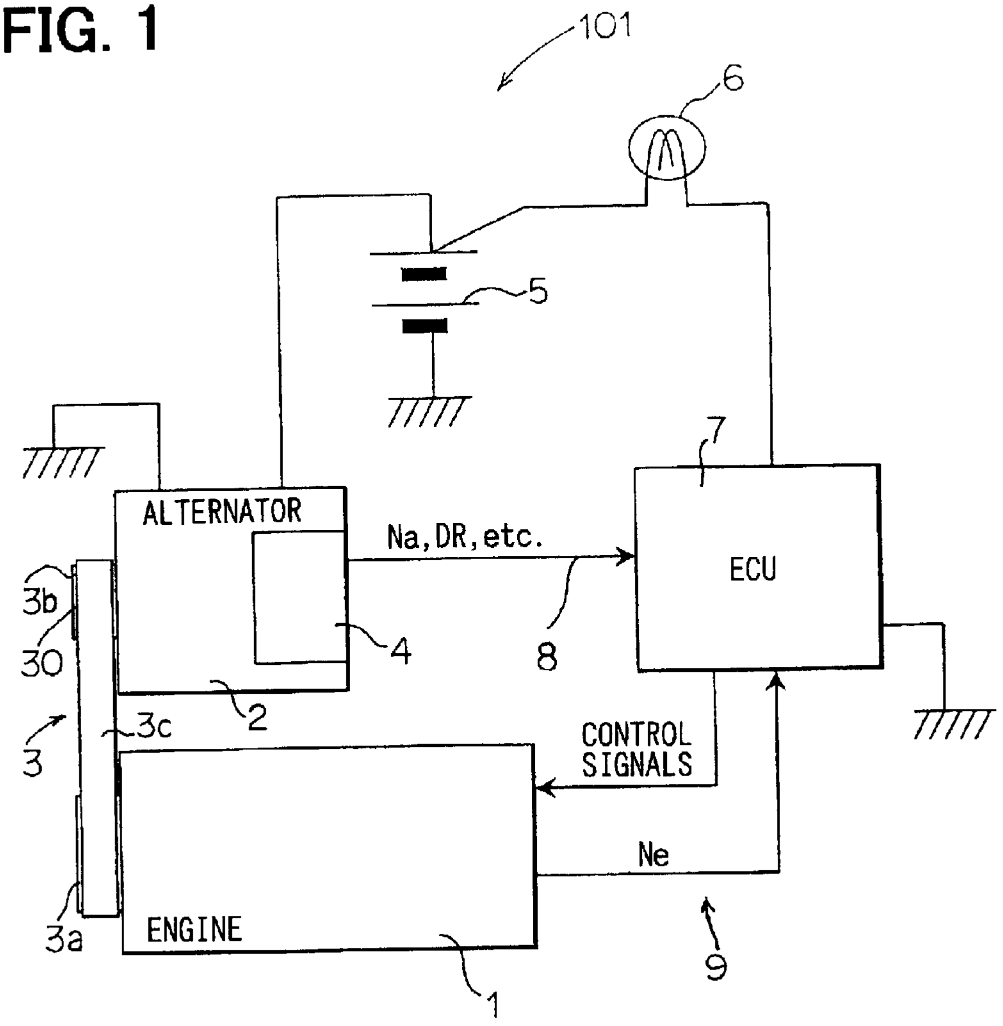
FIG. 1 is a block diagram briefly showing a generator system as a first embodiment of the present invention.

A first embodiment of the present invention will be described with reference to FIGS. 1–6. As shown in FIG. 1, a generator system 101 for use in an automotive vehicle includes: an alternator 2 coupled to an engine 1 through a driving belt device 3; a voltage regulator 4 mounted on the alternator 2; an on-board battery 5 for storing electric power generated by the alternator 2; a warning lamp 6 for informing a driver of detected malfunctions; and an electronic control unit (referred to as ECU) 7 that controls operation of the engine and performs a process of detecting malfunction of a one-way clutch.

Figure 2:
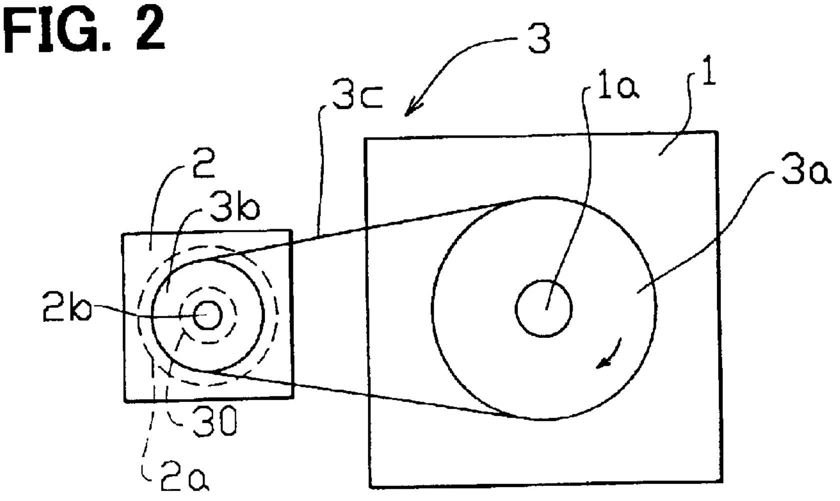
FIG. 2 is a plan view showing a driving belt device coupling an alternator and an engine.

As shown in FIGS. 1 and 2, the driving belt device 3 is composed of a crankshaft pulley 3*a* connected to a crankshaft 1*a* of the engine 1, a pulley 3*b* coupled to a rotor shaft 2*b* of the alternator 2 through a one-way clutch 30, and a driving belt 3*c* coupling the crankshaft pulley 3*a* and the pulley 3*b*. A rotational torque of the engine 1 is transmitted to the rotor 2*a* of the alternator 2 through the driving belt device 3. A diameter of the crankshaft pulley 3*a* is larger than a diameter of the pulley 3*b* so that a rotational speed of the engine 1 is increased by a diameter ratio m of both pulleys 3*a*, 3*b*. When the diameter ratio is set to m, the pulley 3*b* is rotated at a speed of m times of the crankshaft pulley 3*a*. For example, the diameter ratio m may he set to 2.

As shown in FIG. 1, the voltage regulator 4 is connected to the ECU 7 through a data bus 8 so that various data of the alternator 2, including the diameter ratio m, a rotational speed of the rotor 2*a* and a duty-ratio DR of field current supply, are fed to the ECU 7. The engine 1 is connected to the ECU 7 through a data bus 9 so that engine data including its rotational speed Ne are fed to the ECU 7 and control signals are sent from the engine 1 to the ECU 7.

Figure 3:
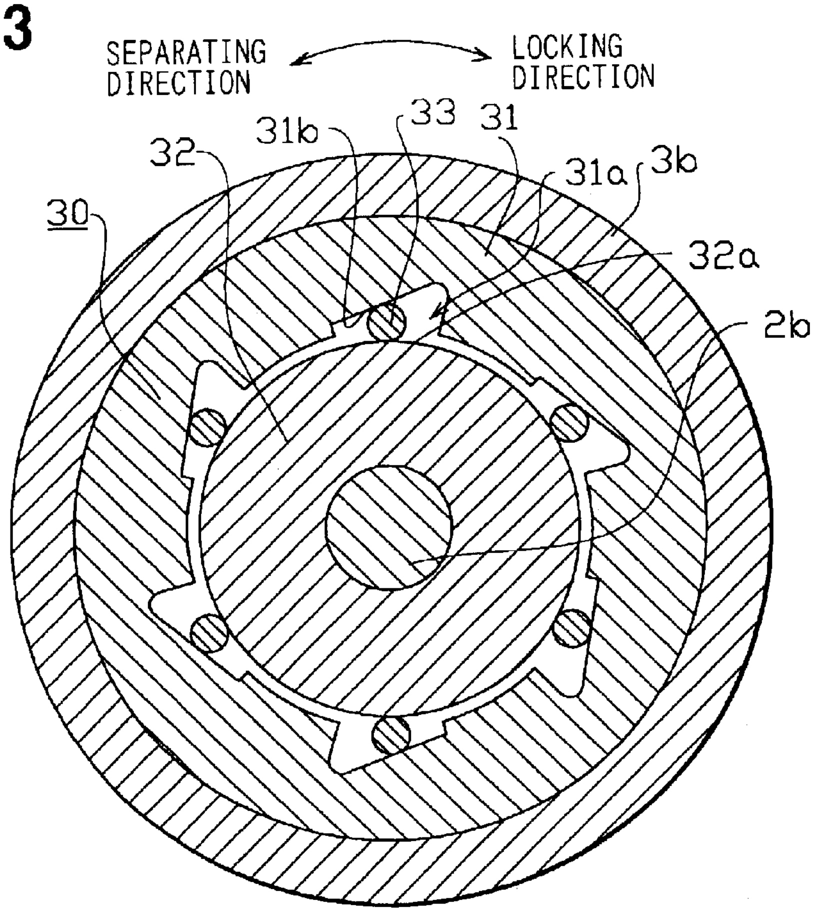
FIG. 3 is a cross-sectional view showing a one-way clutch in an enlarged scale.

Referring to FIG. 3, the structure of the one-way clutch 30 and its function will be described. The one-way clutch 30 is composed of an outer ring 31 fixedly connected to the pulley 3*b*, an inner ring 32 fixedly connected to the rotor shaft 2*b*, and clutch rollers 33 interposed between both rings 31, 32. The outer ring 31 constitutes a driving member, while the inner ring 32 constitutes a driven member. On an inner surface of the outer ring 31, plural roller spaces 31*a* are formed, and a roller 33 is disposed in each roller space 31*a* and is always biased in the counter-clockwise direction by a clutch spring (not shown). The roller space 31*a* includes a slanted surface 31*b* that gradually enlarges the roller space 31*a* in a clockwise direction. The roller space 31*a* is defined by the slanted surface 31*b* and an outer circumference 32*a* of the inner ring.

When the outer ring 31 rotates in the clockwise direction (locking direction) relative to the inner ring 32, the roller 33 is firmly held between both rings 31, 32, thereby connecting (or locking) the outer ring 31 to the inner ring 32. When the outer ring 31 rotates in the counter-clockwise direction (separating direction) relative to the inner ring 32, the roller 33 moves in the clockwise direction against a biasing force and becomes free between both rings 31, 32, thereby separating the outer ring 31 from the inner ring 32.

Figure 4:
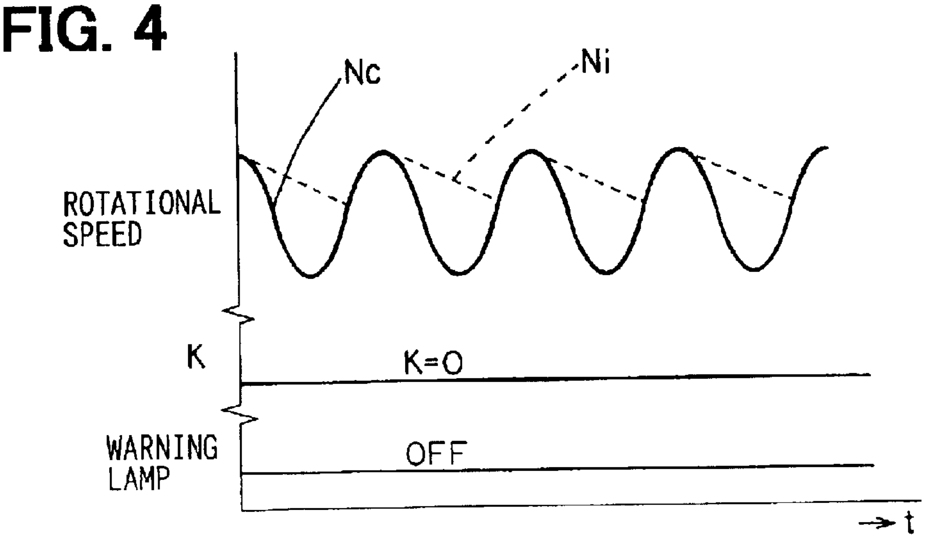
FIG. 4 is a timing chart showing rotational speeds of an outer ring and an inner ring of the one-way clutch, when the one-way clutch is normally functioning.

A rotational speed Nc of the outer ring 31 and a rotational speed Ni of the inner ring 32, when the one-way clutch 30 is normally functioning, are shown in FIG. 4 with a solid line and dotted line, respectively. The outer ring speed Nc periodically changes in response to the engine strokes (i.e., a compression stroke and an explosion stroke) as shown with the solid line. When the engine is decelerating, the outer ring 31 rotates counter-clockwise relative to the inner ring 32, thereby separating the inner ring 32 from the outer ring 31. The inner ring 32 becomes free from the outer ring 31. The inner ring 32 is rotated by an inertia torque of the rotor 2*a*, and thereby the inner ring speed Ni becomes higher than the outer ring speed Nc.

When the engine is accelerating, the outer ring speed Nc increases and the outer ring 31 rotates clockwise relative to the inner ring 32. When the outer ring speed Nc becomes equal to the inner ring speed Ni, the inner ring 32 is again connected to the outer ring 31. Thus, the inner ring speed Ni increases together with the outer ring speed Nc. Thereafter, the same process is repeated as shown in FIG. 4. The outer ring speed Nc is equal to $m \cdot Ne$, where m is the diameter ratio of the crankshaft pulley 3*a* and the pulley 3*b*, and Ne is a rotational speed of the engine (engine speed). The rotational speed Ni of the inner ring 32 is equal to the rotational speed of the rotor 2*a*. As explained above, the one-way clutch 30 intercepts transmission of the inertial torque of the rotor 2*a* to the engine side.

Now, referring to FIG. 5, a process of detecting a malfunction in the one-way clutch 30 will be described. A program for performing the detecting process is stored in a ROM included in the ECU 7, and a microprocessor in the ECU 7 performs the process by reading out the program.

At step S100, after the engine 1 is put into operation, the ECU 7 reads out alternator data including the pulley diameter ratio m from the voltage regulator 4 through the data bus 8. At step S102, counters in the ECU 7 are initialized, i.e., a sampling number n and a number K indicating times of malfunction detection are set to zero. At step S104, a duty-ratio DR(n) for energizing a field coil of the alternator 2 is read out and stored in a RAM. At step S106, the duty-ratio DR(n) is compared with a predetermined threshold duty-ratio $DR_{th}$. If DR(n) is not lower than $DR_{th}$, the process returns step S102.

The duty-ratio DR(n) is a value from 0% to 100%, indicating an operating ratio of the alternator 2. That is, when the duty-ratio DR(n) is high, the alternator 2 generates a high power, and a torque decelerating a rotational speed of the rotor shaft **2*b* becomes high. Therefore, under this condition, the inner ring speed Ni becomes equal to the outer ring speed Nc even when the locking malfunction does not exist in the one-way clutch 30. If the process for detecting the locking malfunction is performed under the condition where the duty-ratio DR(n) is higher than the threshold duty-ratio $DR_{th}$, the locking malfunction is erroneously detected. To avoid this erroneous detection, whether or not the duty-ratio DR(n) is lower than the threshold duty-ratio $DR_{th}$ is checked at step S106**.

If it is determined that the duty-ratio DR(n) is lower than the threshold duty-ratio $DR_{th}$ at step S106, the process proceeds to the next step S108. At step S108, a rotational speed of the rotor **2*a*, i.e., an alternator speed Na(n) is detected based on an output frequency of the alternator 2 fed from the voltage regulator 4 and stored in the RAM. Then, at step S110, the alternator speed Na(n) is divided by the pulley diameter ratio m, thereby obtaining a converted speed N'a(n) that represents the alternator speed Na(n) in terms of a rotational speed of the crankshaft 1*a* [N'a(n)=Na(n)/m]. The converted alternator speed N'a(n) is stored in the RAM, and the process proceeds to step S112**.

At step S112, a converted alternator speed N'a(n−1) that has been obtained in a previous sampling is read out. Then, at step S114, a difference between N'a(n) and N'a(n−1) is calculated, and the speed difference [N'a(n)−N'a(n−1)] is compared with a threshold value $N_{th}$ that has a negative value. The speed difference represents an acceleration ratio of the rotor **2*a* because the alternator speed is sampled with a constant sampling interval. If the speed difference [N'a (n)−N'a(n−1)] is lower than the threshold value $N_{th}$, it is determined that the rotor 2*a* is decelerating with a rate greater than the threshold value $N_{th}$. For example, if the threshold value $N_{th}$ is set to −3,000 rpm and the speed difference [N'a(n)−N'a(n−1)] is −4,000 rpm, it is determined that the rotor 2*a* is decelerating with a greater rate than the predetermined rate. The converted alternator speed N'a(n−1) is set to zero at an initial sampling cycle. In this manner, whether the rotor 2*a*** is decelerating with a substantial rate or not is determined.

The fact that the speed difference [N'a(n)−N'a(n−1)] is not lower than the threshold value $N_{th}$ means that the rotor **2*a* is not substantially decelerating, or is rotating with a constant speed, or is accelerating. In this situation, the detection of the malfunction in the one-way clutch 30 is not carried out, and the process proceeds to step S132. The converted alternator speed N'a(n) is stored at step S132, and the number n of sampling is incremented (n=n+1) at step S134**.

Then, the process returns to step S104. On the other hand, if it is determined that the rotor **2*a* is substantially decelerating at step S114, the process proceeds to the next step S116**.

At step S116, the engine speed Ne(n) is detected, and the process proceeds to step S118. At step S118, the converted alternator speed N'a(n) is compared with the engine speed Ne(n). If N'a(n) is higher than Ne(n), the process returns to step S104 through the steps S132 and S134, because it is determined that there is no locking malfunction in the one-way clutch 30. The fact that the converted alternator speed N'a(n) is higher than the engine speed Ne(n) means that the inner ring 32 of the one-way clutch 30 is being rotated free from the outer ring 31 by the inertia of the rotor **2*a*, and therefore there is no locking malfunction in the one-way clutch 30**.

On the other hand, if the converted alternator speed N'a(n) is not higher than the engine speed Ne(n), that is, the converted alternator speed N'a(n) is equal to the engine speed Ne(n) because there is no situation where the converted alternator speed becomes lower than the engine speed, it is determined that that one-way clutch 30 is at a locked state (locking malfunction). The process proceeds to step S120, and K indicating the number of times where the locking malfunction is detected is incremented (K=K+1). Then, at the next step S122, the number K is compared with a threshold number $K_{th}$. If K is larger than $K_{th}$, it is determined that the locking malfunction actually occurred in the one-way clutch 30. The reason why it is determined that the locking malfunction actually occurred only when the number K reaches the threshold number $K_{th}$ is to eliminate false determination. There is a possibility that errors may be involved in detecting the alternator speed and the engine speed due to interfering noises or other reasons.

If the number K is lower than the threshold $K_{th}$, the process returns to step S104 through the steps S132 and S134. The threshold number $K_{th}$ is set to such a number that the steps S104–S122 are repeated $K_{th}$ times for a predetermined period of time, e.g., 10–20 milliseconds. It is preferable, however, to change the threshold number $K_{th}$ to an appropriate number according to the numbers of engine cylinders, a predetermined idling speed or other factors.

The fact that the determination at step S122 is affirmative (YES) means that the locking state occurred in the one-way clutch 30 in excess of $K_{th}$ times during a predetermined period in which the alternator speed is decreasing. Therefore, it is determined that the locking malfunction exists in the one-way clutch 30, and the process proceeds to next steps. At step S124, a timer is set to count a certain period of time, e.g., 2 seconds. At the next step S126, a warning lamp 6 is turned on to inform a driver of the detected clutch malfunction. The warning lamp 6 is lit until a time period $T_{th}$ lapses after the lamp is turned on (steps S126 and S128). Then, the warning lamp 6 is turned off at step S130, and the process returns to step S102 to repeat the steps described above.

Figure 6:
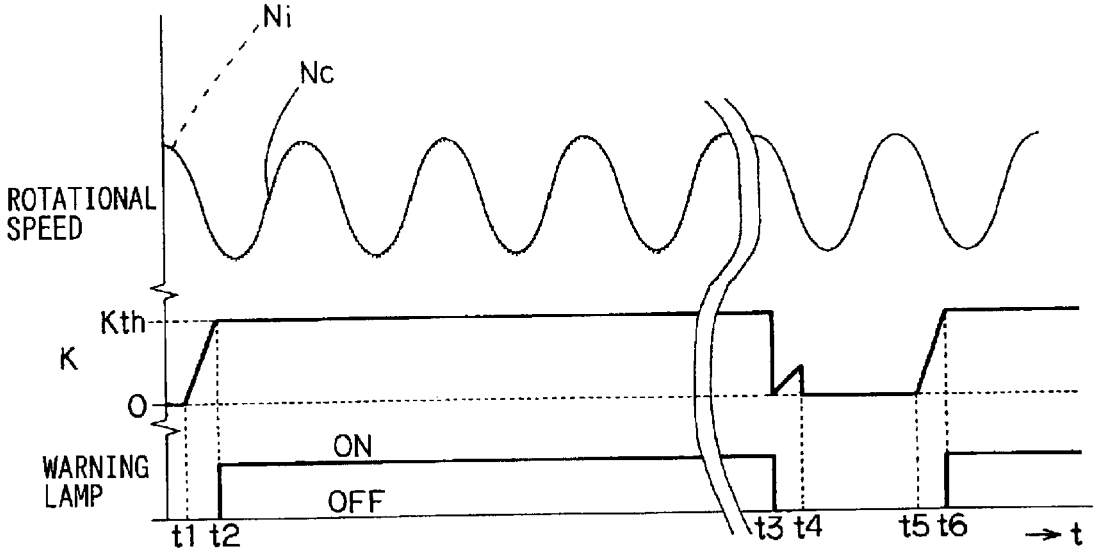
FIG. 6 is a timing chart showing rotational speeds of the inner and outer rings of the one-way clutch, when the one-way clutch is malfunctioning.

Referring to a timing chart shown in FIG. 6, a relation between the inner ring speed Ni and the outer ring speed Nc, the counter number K, and turning ON and OFF of the warning lamp 6, under a situation where the locking malfunction occurs in the one-way clutch 30, will be explained. When the locking malfunction occurs in the one-way clutch 30, the inner ring speed Ni and the outer ring speed Nc become equal to each other throughout all the periods irrespective of whether the alternator speed Na is increasing or decreasing.

When it Is detected that the inner ring speed Ni is equal to the outer ring speed Nc (i.e., N'a=Ne) at time t1 in the period in which the alternator speed Na (or the engine speed Ne) is decreasing, the counter number K is incremented. When the counter number K reaches the threshold number $K_{th}$ at time t2, the warning lamp 6 is turned on. At time t3 when a predetermined time period lapses after time t2, the warning lamp 6 is turned off and the K counter is rest to zero. If the alternator or the engine speed is decreasing at this time t3, the counter number K is again incremented. At time t4 when the speed-decreasing period ends, the K counter is reset to zero. If the locking state is detected at time t5 in the following speed-decreasing period, the K counter is again incremented. If the counter number K reaches the threshold number $K_{th}$ at time t6, the warning lamp 6 is turned on. The process described above is repeated. Under the situation where the one-way clutch 30 is normally functioning as shown in FIG. 4, the counter number K is not incremented, and therefore the warning lamp 6 is not lit.

In the generator system 101 described above, the locking malfunction in the one-way clutch 30 is effectively and surely detected. When the malfunction warning is given to the driver, the driver is able to take an appropriate action against the malfunction, such as replacing or repairing the one-way clutch 30. The ECU 7 performs usual engine control processes in parallel to performing the process of detecting the clutch malfunction.

Figure 7:
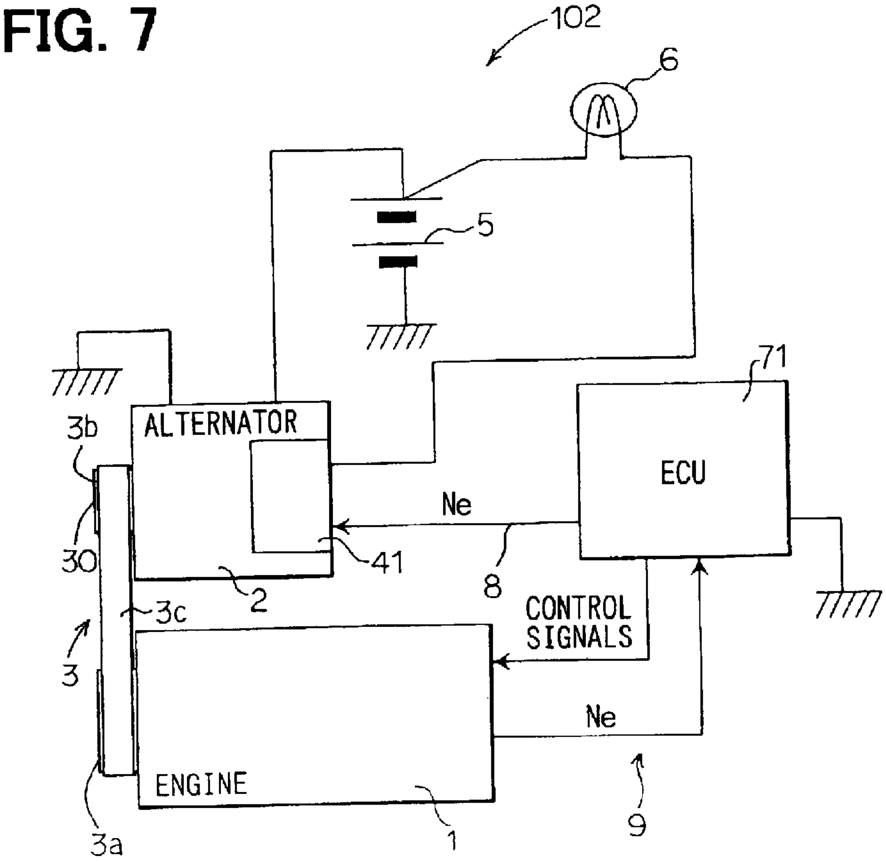
FIG. 7 is a block diagram briefly showing a generator system as a second embodiment of the present invention.

A second embodiment of the present invention will be described with reference to FIG. 7. In a generator system 102, a voltage regulator 41 mounted on the alternator 2 includes a microprocessor and a ROM for performing the process of detecting the clutch malfunction shown in FIG. 5. The voltage regulator 41 receives engine data including the diameter of the crankshaft pulley 3*a* from an ECU 71 through the data bus 8 and calculates the pulley diameter ratio m (step S100). The engine speed Ne fed from the ECU 71 is compared with the converted alternator speed N'a (steps S116 and S118). Since a circuit for operating the warning lamp indicating malfunctions in the alternator is usually included in the voltage regulator, it is advantageous to add the function to detect the clutch malfunction to the voltage regulator. The microprocessor in the voltage regulator 41 performs usual functions such as an alternator voltage control and malfunction detection in the alternator in parallel to performing the process of detecting the clutch malfunction.

Figure 8:
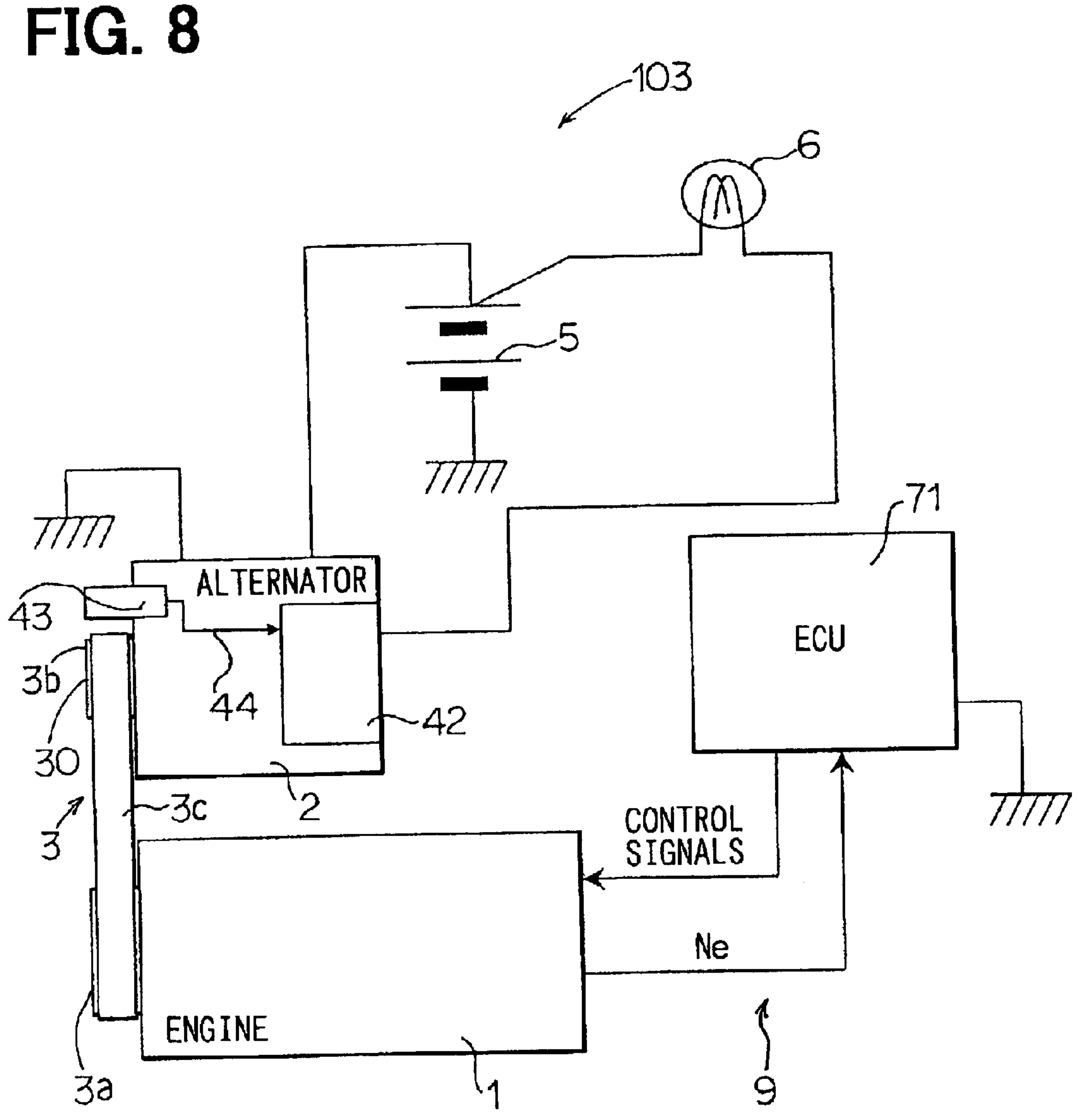
FIG. 8 is a block diagram briefly showing a generator system as a third embodiment of the present invention.

A third embodiment of the present invention will be described with reference to FIG. 8. This embodiment is similar to the second embodiment. That is, the process of detecting the malfunction in the one-way clutch 30 (shown in FIG. 5) is performed by the microprocessor included in a voltage regulator 42. However, the engine speed Ne represented by the outer ring speed Nc is fed to the voltage regulator 42 from a sensor 43 that directly detects the outer ring speed Nc through a data bus 44.

In this embodiment, it is not necessary to convert the alternator speed Na to the converted speed N'a because the alternator speed Na (which is equal to the inner ring speed Ni) is directly compared with the outer ring speed Nc at step S118. The deceleration rate of the rotor 2*a* is determined based on the alternator speed Na (step S114) without converting the alternator speed Na to the converted speed N'a. Other steps are the same as those in the first embodiment. Because no data communication is required between the voltage regulator 42 and the ECU 71 in this third embodiment, the system is simplified and made more reliable.

The present invention is not limited to the foregoing embodiments, but they may be variously modified. For example, the one-way clutch 30 shown in FIG. 3 may be replaced with other types of one-way clutch. Alternatively, a clutch, which intercepts transmission of inertial torque of the alternator 2 to the outer ring by means of slippage of the inner ring and is composed of a torsion spring and clutch shoes, may be used. Though only the locking malfunction in the clutch is detected in the foregoing embodiments, other malfunctions may detected.

Though the clutch malfunction is notified to a driver by means of the warning lamp 6 in the foregoing embodiments, it is of course possible to use other warning devices such as a buzzer. It may not be necessary to notify the clutch malfunction every time it occurs, but the malfunction may be notified at a time of vehicle inspection.

Figure 5:
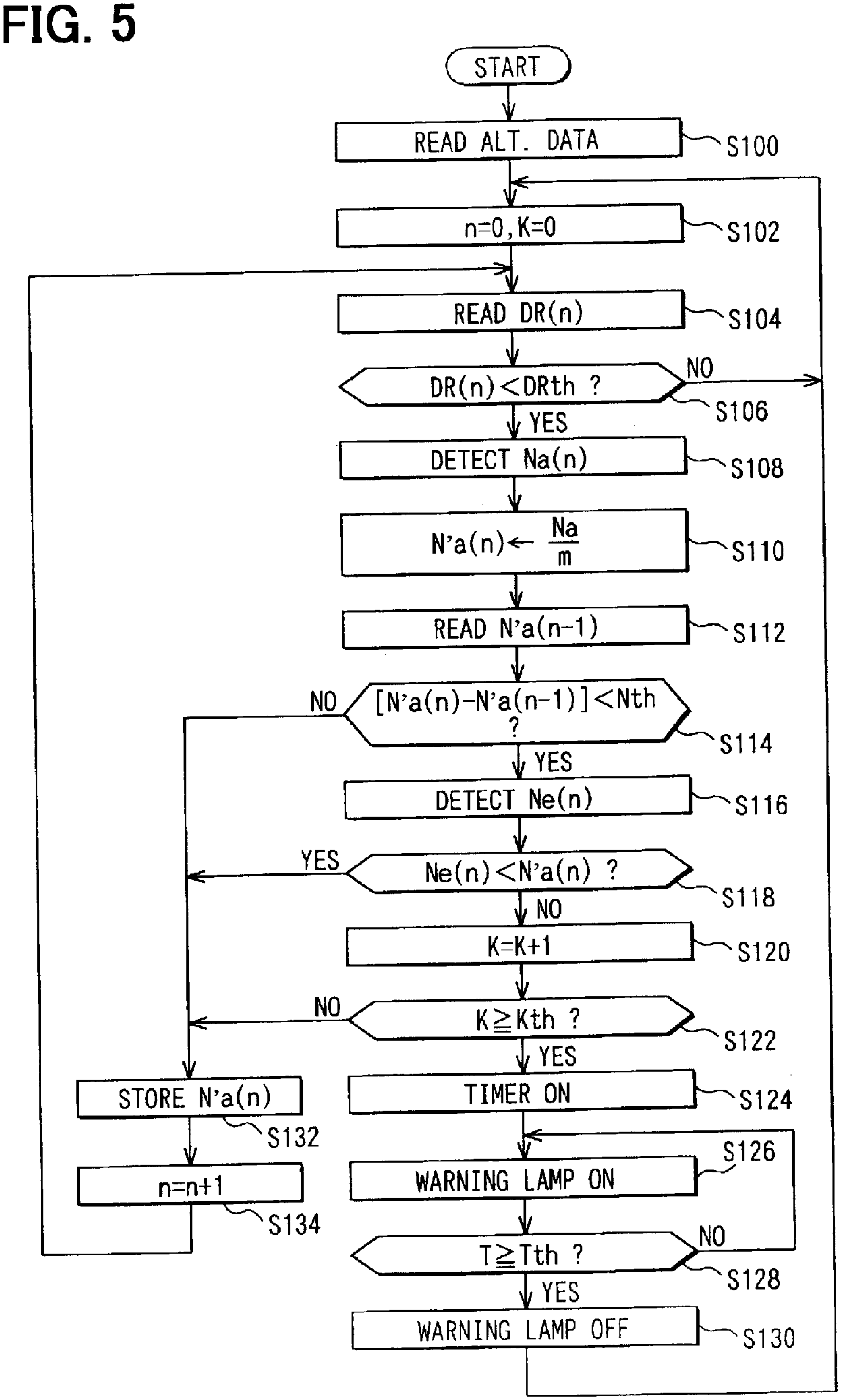
FIG. 5 is a flowchart showing a process of detecting malfunction in the one-way clutch.

Though the decelerating condition is detected based on the converted alternator speed N'a(n) at steps S112 and S114 in the process shown in FIG. 5, it is also possible to detect the deceleration condition based on the engine speed Ne or the outer ring speed Nc. Though the locking malfunction is detected by comparing the engine speed Ne and the converted alternator speed N'a (N'a=Na/m, where m is the pulley diameter ratio), it is, of course, possible to compare the alternator speed Na with m·Ne. The locked state of the one-way clutch 30 is detected in the first and the second embodiments when the converted alternator speed N'a becomes equal to the engine speed Ne (N'a=Ne). Similarly, the locked state is detected in the third embodiment when the inner ring speed Ni becomes equal to the outer ring speed Nc. It is preferable to design the system to detect the locked state when those speeds become substantially equal (if not exactly equal), because there is a possibility that those speeds do not become exactly equal even if the one-way clutch 30 is in a locked state.

According to the present invention, the malfunctions in the one-way clutch, such as the locking malfunction is surely detected. When the malfunction is detected, it is notified to a driver by means of the warning lamp or the like, and the defective clutch can be repaired or replaced with a new one. Accordingly, the driving belt is prevented from being damaged by the clutch malfunction, and an operable life of the driving belt is prolonged. The process of detecting the clutch malfunction is flexibly applicable to various alternators having respective pulley sizes only by slightly modifying the software in the system without changing any hardware.

Further, the locking malfunction is detected only when such malfunction occurs more than a predetermined times in a certain period of time. Therefore, a false detection due to a temporary locking, which may accidentally occur when the clutch is actually normal, can be avoided. Further, the detection of the malfunction is prohibited when the alternator is outputting a high power, i.e, when the duty-ratio DR of field current supply exceeds a predetermined ratio $DR_{th}$ and thereby the alternator speed Na becomes equal to the outer ring speed Nc even if there is no clutch malfunction. Therefore, a false detection of the clutch malfunction under such condition is avoided.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A generator system for use in an automotive vehicle powered by an engine, the generator system comprising:

an alternator having a rotor;

a driving belt for driving the rotor by the engine;

a one-way clutch that transmits a rotational torque of the engine to the rotor and prevents transmission of an inertial rotational torque of the rotor to the engine, the one-way clutch having a driving member connected to the engine through the driving belt and a driven member connected to the rotor, wherein;

the generator system further includes means for detecting a malfunction in the one-way clutch, and the detecting means detects the malfunction when the driving member and the driven member are in a locked state, the detecting means comprising;

a first speed detector for detecting a rotational speed of the rotor;

a second speed detector for detecting a rotational speed of the engine;

deceleration-detecting means for detecting a deceleration state where a rotational speed of the engine or the rotor is decreasing;

means for converting the rotational speed of the rotor to a converted rotor speed by dividing the rotational speed of the rotor by a pulley diameter ratio, the pulley diameter ratio being a ratio of a diameter of a crankshaft pulley connected to the engine relative to a diameter of a pulley connected to the driven member of the one-way clutch; and means for determining that the driving member and the driven member are in the locked state if the converted rotor speed is substantially equal to the rotational speed of the engine under the deceleration state.

2. The generator system as in claim 1, wherein:

the generator system further includes means for notifying the detected malfunction in the one-way clutch.

3. The generator system as in claim 1, wherein:

the first speed detector detects the rotational speed of the rotor based on an output frequency of the alternator.

4. The generator system as in claim 1, wherein:

the detecting means is disposed in an electronic control unit that controls operation of the engine.

5. The generator system as in claim 4, wherein:

the alternator includes a voltage regulator mounted thereon; and the detecting means receives data concerning the alternator including a rotational speed ratio between the engine and the rotor from the voltage regulator through a data bus.

6. The generator system as in claim 1, wherein:

the alternator includes a voltage regulator mounted thereon; and the detecting means is disposed in the voltage regulator.

7. The generator system as in claim 6, wherein:

the second speed detector receives data concerting the rotational speed of the engine from an electronic control unit that controls operation of the engine through a data bus.

8. The generator system as in claim 1, wherein:

the one-way clutch includes an outer ring constituting the driving member and an inner ring constituting the driven member, the inner ring being disposed coaxially with the outer ring; and the detecting means comprises first means for detecting a rotational speed of the outer ring, second means for detecting a rotational speed of the inner ring, a third means for detecting a deceleration stale of the outer ring or the inner ring, and a fourth means for determining that the outer ring and the inner ring are in the locked state when the rotational speed of the inner ring becomes substantially equal to the rotational speed of the outer ring under the deceleration state.

9. The generator system as in claim 1, wherein:

the detecting means includes a counter for counting a number of occurrences of the locked state; and the detecting means determines that the malfunction occurred in the one-way clutch when the number of locked state occurrences reaches a predetermined number within a predetermined period of time.

10. A generator system for use in an automotive vehicle powered by an engine, the generator system comprising:

an alternator having a rotor;

a driving belt for driving the rotor by the engine;

a one-way clutch that transmits a rotational torque of the engine to the rotor and prevents transmission of an inertial rotational torque of the rotor to the engine, the one-way clutch having a driving member connected to the engine through the driving belt and a driven member connected to the rotor, wherein;

the generator system further includes means for detecting a malfunction in the one-way clutch;

the detecting means is disposed in an electronic control unit that controls operation of the engine;

the alternator includes a voltage regulator mounted thereon; and the detecting means receives data concerning the alternator including a rotational speed ratio between the engine and the rotor from the voltage regulator through a data base.

11. A generator system for use in an automotive vehicle powered by an engine, the generator system comprising:

an alternator having a rotor, a driving belt for driving the rotor by the engine;

a one-way clutch that transmits a rotational torque of the engine to the rotor and prevents transmission of an inertial rotational torque of the rotor to the engine, the one-way clutch having a driving member connected to the engine through the driving belt and a driven member connected to the rotor, wherein:

the generator system further includes means for detecting a malfunction in the one-way clutch;

the detecting means detects the malfunction when the driving member and the driven member are in a locked state;

the one-way clutch includes an outer ring constituting the driving member and an inner ring constituting the driven member, the inner ring being disposed coaxially with the outer ring; and the detecting means comprises first means for detecting a rotational speed of the outer ring, second means for detecting a rotational speed of the inner ring, a third means for detecting a deceleration state of the outer ring or the inner ring, and a fourth means for determining that the outer ring and the inner ring are in the locked state when the rotational speed of the inner ring becomes substantially equal to the rotational speed of the outer ring under the deceleration state.

12. A generator system for use in an automotive vehicle powered by an engine, the generator system comprising:

an alternator having a rotor;

a driving belt for driving the rotor by the engine;

a one-way clutch that transmits a rotational torque of the engine to the rotor and prevents transmission of an inertial rotational torque of the rotor to the engine, the one-way clutch having a driving member connected to the engine through the driving belt and a driven member connected to the rotor, wherein:

the generator system further includes means for detecting a malfunction in the one-way clutch;

the detecting means detects the malfunction when the driving member and the driven member are in a locked state;

the detecting means includes a counter for counting a number of occurrences of the locked state; and the detecting means determines that the malfunction occurred in the one-way clutch when the number of locked state occurrences reaches a predetermined number within a predetermined period of time.

* * * * *